April 23, 1968  H. B. WHITMORE  3,379,212
VACUUM REGULATING APPARATUS
Filed Dec. 7, 1965
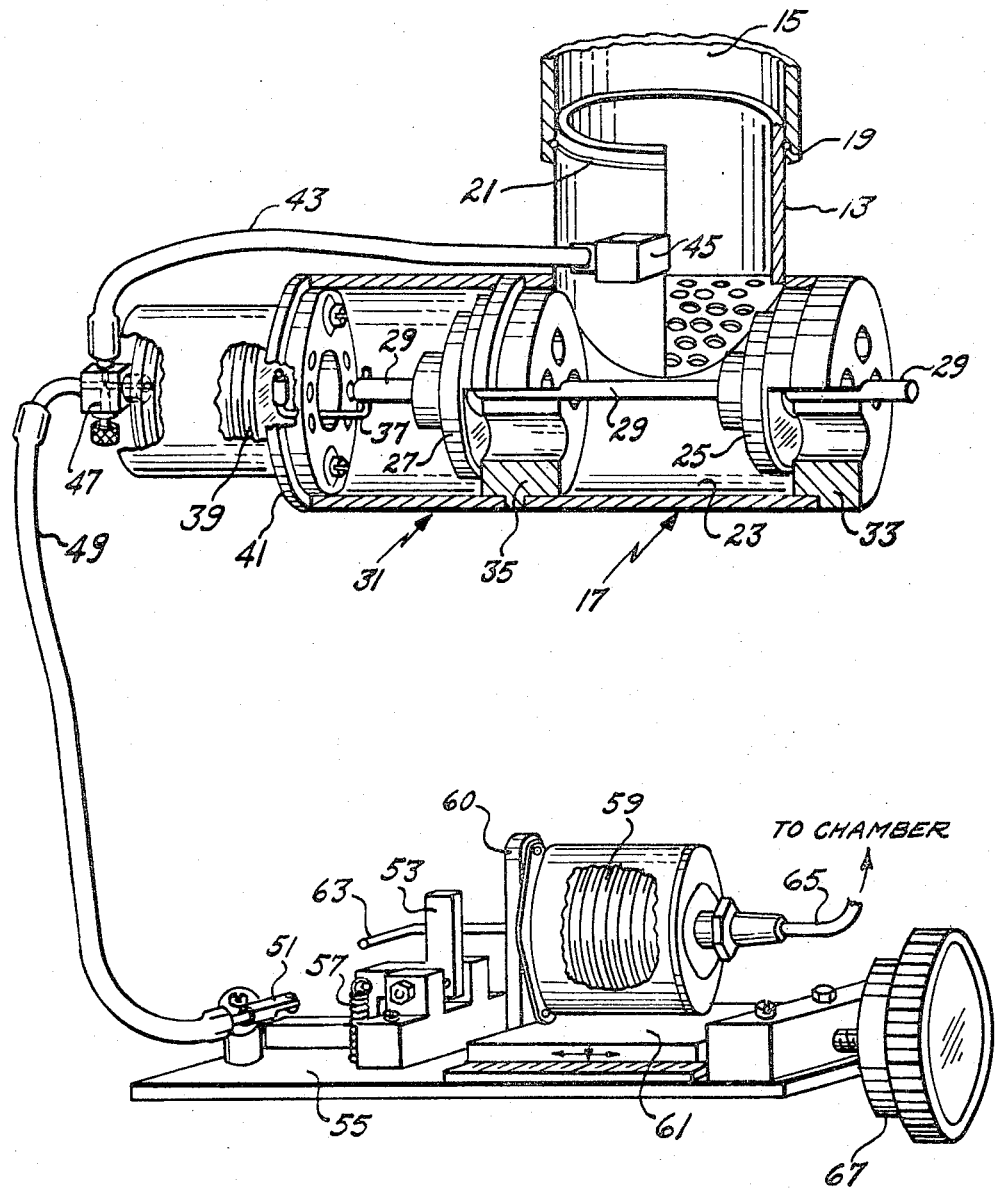
INVENTOR.
HENRY B. WHITMORE
BY Harry A. Herbert Jr.
Arsen Tashjian
ATTORNEYS

United States Patent Office 3,379,212
Patented Apr. 23, 1968

3,379,212
VACUUM REGULATING APPARATUS
Henry B. Whitmore, Rte. 5, Box 369,
San Antonio, Tex. 78211
Filed Dec. 7, 1965, Ser. No. 512,248
3 Claims. (Cl. 137—489.5)

The invention described herein may be manufactured and used by or for the United States Government for governmental purposes without payment to me of any royalty thereon.

This invention relates to a valve arrangement for automatically maintaining a vacuum chamber at a predetermined negative pressure. More particularly, the invention is concerned with providing a simple inexpensive means for automatically controlling the vacuum conditions in a chamber used for simulated upper altitude experiments within close tolerances for extended periods of time.

Although vacuum regulating valves are presently in use for controlling the negative pressure in a vacuum chamber, they are not fully satisfactory because it is generally necessary to use unduly complicated mechanisms which reduce their dependability under most operating conditions. Also, most presently known systems are complex and include extensive installation and maintenance requirements. The present invention is directed to a mechanically activated automatic vent and level off valve which is extremely dependable and completely portable. No power supply is required and the system is relatively simple and inexpensive to operate. No particular skills are necessary in order to install or operate the system. The present invention provides means for maintaining an altitude chamber at a given value by a single operator for extended periods of time where pre-set altitude conditions are required.

Accordingly, it is an object of the present invention to provide a vacuum regulating apparatus which is easily installed and operated and which is capable of maintaining a chamber at a negative pressure to simulate a given altitude for extended periods of time.

Another object of the invention is to provide a vacuum regulating apparatus having a valving arrangement which is responsive to changes in pressure in an enclosed evacuated chamber and providing control means for automatically correcting deviations from the desired negative pressure.

Still another object of the invention is to provide a vacuum control system which utilizes pressure sensing elements having bellows which respond to pressure variations in the evacuated chamber to which the sensing elements are attached.

A further object of the invention is to provide a vacuum regulating apparatus having a double acting valve arrangement controlled by a bellows for regulating the internal pressure of an altitude chamber by allowing the entrance of air at atmospheric pressure, thereby reducing the negative pressure and maintaining the chamber at a predetermined simulated altitude value.

A still further object of the invention is to provide a relatively simple and inexpensive vacuum regulating apparatus which is easily and conveniently adjusted to maintain an evacuated chamber at a desired level of vacuum to simulate a predetermined altitude.

These and other objects, features and advantages will become more apparent after considering the following detailed description taken in conjunction with the annexed drawing and appended claims.

In the drawing, there is shown a perspective view in partial section of regulating apparatus according to the invention for automatically controlling the negative pressure in a vacuum chamber to simulate upper altitude conditions.

Referring now to the drawing, the chamber mount 13 is attached to a sealed chamber represented by the numeral 15 and to the body portion 17. An O-ring 19 is positioned in the groove 21 and serves to provide an air-tight seal between the chamber mount 13 and the chamber 15. The body portion 17 includes an elongated cylinder 23 which contains the inside valve 25 fixedly attached to the shaft 29. Also attached to the shaft 29 is the outside valve 27 which is disposed in restrictor section 31. Each of the valves 25 and 27 is provided with corresponding valve seats 33 and 35. An operating arm 37 is attached between the end of the shaft 29 near the outside valve 27 and a bellows 39 which is attached at the bellows mount 41.

The inside of the bellows 39 is in communication with one end of a bleed line 43. A bleed line connection 45 is attached to the other end of bleed line 43 and is positioned in the chamber mount 13. A bleed control needle 47 is provided in the bleed line 43 near the bellows 39 to control the flow of air thereinto. Also, in communication with the inside of the bellows 39 and the bleed control needle 47 is a control bleed line 49 which carries bleed air from the normally open control bleed valve 51. A pivotably mounted valve restricting arm 53 is mounted on the base plate 55 and is positioned so that upward movement thereof restricts the flow of air through control bleed valve 51. A biasing spring 57 attached between the arm 53 and base plate 55 serves to hold the arm 53 downward away from valve 51.

An altitude sensing bellows 59 is attached to the vertical member 60 which is positioned on the forward edge of the slide plate 61 slidably attached to the base plate 55. A working arm 63 extends outwardly from the forward surface of the altitude sensing bellows 59 and reacts according to the movement of the bellows 59 to move the valve restricting arm 53 against the normally open control bleed valve 51, thereby operating to close it. A chamber sensor line 65 is connected between the altitude sensing bellows 59 and the chamber 15 and serves to control the expansion and contraction of the bellows 59. An altitude control knob 67 serves to adjust the relative position of slide plate 61 with respect to base plate 55, thereby changing the position of the altitude sensing bellows 59 and the working arm 63 resulting in a greater or lesser amount of free bellows movement before effectuating a change in the position of the control bleed valve 51.

In operation, the chamber mount 13 is plugged into a port in chamber 15. The O-ring 19 in the O-ring groove 21 is provided to prevent leakage around the connection. Although in the embodiment shown in the drawing an O-ring is utilized for purposes of sealing the connection, it should be noted that the chamber mount 13 of the regulating apparatus may also be attached by threading into the chamber port or by bolting to the chamber wall using a gasket between mating surfaces.

With the chamber at ground level (normal atmospheric pressure) the inside valve 25 and the outside valve 27 which are both mounted on the shaft 29 are resting on their valve seats 33 and 35, respectively. Since both valves 25 and 27 are mounted on the same shaft 29, the movement of one will result in equal movement of the other.

The inside valve 25 is located in the body portion 17 while the outside valve 27 is located in the restrictor section 31 which is open to ambient. This arrangement serves to maintain both valves in seated position at ground pressure.

As vacuum is applied to the chamber 15 to simulate the reduction of pressure as a body ascends to upper atmosphere, air begins to flow through bleed line connection 45 from bleed line 43 into the chamber 15. This flow is controlled by bleed control needle 47 so that a small vacuum condition is exposed to the bellows 39 which is connected to the shaft 29 by the operating arm 37. Since the control bleed valve 51 is open, no vacuum build-up is obtained because bleed air passes through the control bleed line 49 to the bleed control needle 47 to balance the small vacuum condition in that area so that the bellows 39 are not affected and the valves 25 and 27 remain seated. This condition allows the vacuum in the chamber 15 to continue to increase to some predetermined value to correspond to conditions at upper altitudes.

As the vacuum in the chamber 15 increases beyond the predetermined value, the air in the altitude sensing bellows 59 is withdrawn through the chamber sensing line 65 which is connected to the chamber 15. This causes the working arm 63 which is attached to the bellows 59 to be drawn inwardly and make contact with the pivotably mounted valve restricting arm 53. Further movement of the bellows 59 caused by increasing vacuum in the chamber 15 produces a pivoting motion of the arm 53 lifting the outer end against control bleed valve 51. This causes the normally open control bleed valve 51 to close cutting off the supply of bleed air passing through control bleed line 49 to the bleed control needle 47 resulting in a build-up of vacuum in the bellows 39 because the negative pressure at bleed line connection 45 located in the chamber 15 causes air in the bellows 39 to be drawn through the bleed line 43. As the bellows 39 contracts, the valves 25 and 27 become unseated from their respective valve seats 33 and 35 thereby allowing air at atmospheric pressure to enter the chamber 15 through the body portion 17 and the chamber mount 13. This decreases the vacuum and stabilizes conditions in the chamber 15 by causing the altitude sensing bellows 59 to expand and allow the working arm 63 to release valve restricting arm 53 and open control bleed valve 51 which causes air to be drawn through control bleed line 49, through bleed control needle 47, and into the bellows 39 which expands and forces valves 25 and 27 into closed position stopping the flow of air into the chamber 15. As the vacuum in the chamber 15 increases beyond the predetermined value, the cycle is repeated.

Adjusting means including the altitude control knob 67 are provided for controlling the vacuum conditions and corresponding altitude simulation. The altitude sensing bellows 59 is mounted on vertical member 60 attached to slide plate 61. A threaded shaft extends from the altitude control knob 67 into the slide plate 61. When the knob 67 is turned, the slide plate 61 and the attached bellows 59 and working arm 63 move laterally varying the distance between the working arm 63 and the valve restricting arm 53. This adjustment determines the amount of negative pressure build-up in the chamber 15 before the regulating apparatus becomes operative and reduces the pressure, thereby controlling the corresponding altitude simulated in the chamber 15. The position of slide plate 61 may be calibrated and pre-set to produce any desired altitude reading in the chamber 15.

It should be apparent from the above description that the disclosed invention provides a vacuum regulating system which is portable in nature and adaptable to all altitude chambers. Only simple adjustments which can be easily accomplished by relatively unskilled personnel are necessary to produce the desired result because the apparatus is basically automatic. Also, because of the relatively simple arrangement of the various elements, the herein disclosed valve system is extremely dependable especially when utilized as the primary control system for simulated long duration chamber flights necessary to solve problems in medical research projects.

Although the invention has been illustrated and described in terms of a preferred embodiment thereof, it will be apparent to one skilled in the art that certain changes, alterations, modifications, and substitutions can be made in the arrangement and location of the various elements without departing from the spirit and scope of the appended claims.

Having thus set forth and described the nature of my invention, what I claim is:

1. An automatic vacuum regulating apparatus for maintaining the negative pressure in an altitude simulation chamber, said apparatus comprising a chamber mount for attaching the apparatus to a port in said chamber, an elongated cylindrical body portion in communication with said chamber mount, a first valve disposed inside said body portion, a restrictor section positioned in axial alignment adjacent to said body portion, a second valve disposed in said restrictor section, a laterally movable shaft passing through said body portion and into said restrictor section, said first and second valves being fixedly attached to said shaft and movable therewith, a first valve seat operatively associated with said first valve and forming one end member of said body portion, a second valve seat operatively associated with said second valve and forming the other end of said body portion and one end of said restrictor section, a bellows attached to a bellows mount forming the other end of said restrictor section, said bellows having one end closed and the other end in communication with said chamber, an operating arm connected between one end of said shaft and the closed end of said bellows, the expansion and contraction of said bellows producing a corresponding lateral movement of said shaft, a bleed line connection disposed in said chamber mount, a bleed line connecting said bleed line connection to the open end of said bellows, a bleed control needle positioned at the open end of said bellows for controlling the air flow to and from said bellows, a normally open control bleed valve in communication with said bleed control needle through a control bleed line for feeding bleed air to said bellows, a pivotally mounted valve restricting arm having one end positioned under said control bleed valve, a laterally movable working arm in spaced relation to the other end of said valve restricting arm and operatively associated therewith, lateral movement of said working arm causing a corresponding pivoting movement of said valve restricting arm and lifting said arm against said control bleed valve to stop the flow of bleed air therethrough, and an altitude sensing bellows having one end closed and the other end in communication with said chamber through a chamber sensor line, said working arm being attached to the closed end of said altitude sensing bellows to produce a lateral movement proportional to the negative pressure in said altitude simulation chamber.

2. The automatic vacuum regulating apparatus defined in claim 1 wherein adjusting means are provided to control the negative pressure in said chamber, said adjusting means comprising a laterally movable slide plate for fixedly mounting said altitude sensing bellows thereon, an altitude control means for laterally positioning said slide plate and attached altitude sensing bellows relative to said valve restricting arm, the lateral position of said altitude sensing bellows determining the position of said working arm attached thereto thereby regulating the distance between said laterally movable working arm and said pivotably mounted valve restricting arm to control the negative pressure in said chamber at which said bleed control valve is closed by said valve restricting arm to allow air to enter said chamber and restore the negative pressure in said chamber to the proper value.

3. The automatic vacuum regulating apparatus defined in claim 1 wherein biasing means are provided for retaining said valve restricting arm downward away from said control bleed valve and in position for interaction with said working arm while the negative pressure in said chamber is increasing.

No references cited.

M. CARY NELSON, *Primary Examiner.*

R. J. MILLER, *Assistant Examiner.*